US006839663B1

(12) United States Patent
Temkin et al.

(10) Patent No.: US 6,839,663 B1
(45) Date of Patent: Jan. 4, 2005

(54) HAPTIC RENDERING OF VOLUMETRIC SOFT-BODIES OBJECTS

(75) Inventors: Bharti Temkin, Ransom Canyon, TX (US); Jonathan R. Burgin, Elmendorf, TX (US)

(73) Assignee: Texas Tech University, Lubbock, TX (US)

( * ) Notice: Subject to any disclaimer, the term of this patent is extended or adjusted under 35 U.S.C. 154(b) by 581 days.

(21) Appl. No.: 09/677,073

(22) Filed: Sep. 29, 2000

Related U.S. Application Data

(60) Provisional application No. 60/156,852, filed on Sep. 30, 1999.

(51) Int. Cl.$^7$ .............................. G06F 17/50; G06G 7/62
(52) U.S. Cl. .............................. 703/13; 703/20; 703/22; 318/568.11; 318/568.16; 318/568.17; 345/419; 345/424; 345/184; 345/173; 345/177
(58) Field of Search .............................. 703/13, 20, 22; 318/568.11, 568.16, 568.17; 345/419, 424, 184, 173, 177

(56) References Cited

U.S. PATENT DOCUMENTS

| | | | | |
|---|---|---|---|---|
| 5,548,694 A | * | 8/1996 | Frisken Gibson | 345/424 |
| 5,709,219 A | | 1/1998 | Chen et al. | 128/782 |
| 5,724,264 A | | 3/1998 | Rosenberg et al. | 364/559 |
| 5,737,505 A | | 4/1998 | Shaw et al. | 395/119 |
| 5,802,353 A | * | 9/1998 | Avila et al. | 703/13 |
| 5,831,408 A | | 11/1998 | Jacobus et al. | 318/568 |
| 5,833,633 A | | 11/1998 | Sarvazyan | 600/587 |
| 5,844,392 A | | 12/1998 | Peurach et al. | 318/568 |
| 5,973,678 A | * | 10/1999 | Stewart et al. | 345/184 |
| 6,057,828 A | | 5/2000 | Rosenberg et al. | 345/156 |
| 6,069,634 A | * | 5/2000 | Gibson | 345/424 |
| 6,421,048 B1 | * | 7/2002 | Shih et al. | 345/419 |
| 6,552,722 B1 | * | 4/2003 | Shih et al. | 345/419 |

OTHER PUBLICATIONS

U.S. Appl. No. 09/844,635, filed Apr. 28, 2001, Temkin et al.
U.S. Appl. No. 09/844,881, filed Apr. 28, 2001, Temkin et al.
U.S. Appl. No. 60/156,852, filed Sep. 30, 1999, Temkin et al.
Acosta, E. et al., "Development of a Haptic Virtual Environment," Proc. $12^{th}$ Symp. IEEE/Computer–Based Medical Systems CBMS–1999, Jun. 19–20, 1999.
Acosta, E. et al., "G2H—Graphics–to–Haptic Virtual Environment Development Tool for PC's," Medicine Meets Virtual Reality, Envisioning Healing, J. D. Westwood et al. (Eds), MMVR2000, Jan. 27–30, 2000.
Watson, K. et al., "Development of Haptic Stereoscopic Virtual Environments," Proc. $12^{th}$ Symp. IEEE/Computer–Based Medical Systems CBMS, Jun. 19–20, 1999.
Stephens, B. et al., "Virtual Body Structures: A 3D Structure Development Tool from Visible Human Data", Medicine Meets Virtual Reality, Envisioning Healing, J. D. Westwood et al. (Eds), MMVR2000, Jan. 27–30, 2000.
Burgin, J. et al., "Haptic Rendering of Volumetric Soft–Bodies Objects," The third PHANToM User Workshop (PUG 98), Oct. 3–6, 1998 MIT Endicott House, Dedham, MA.

(List continued on next page.)

*Primary Examiner*—Anthony Knight
*Assistant Examiner*—Thomas Pham
(74) *Attorney, Agent, or Firm*—Perkins Smith & Cohen LLP; Jerry Cohen; Jacob N. Erlich

(57) ABSTRACT

Haptic rendering of three-dimensional soft bodied objects for virtual interactions implemented by forming a three dimensional occupancy map of voxels, forming the surface of and bounding an object, forming a multi-dimensional coordinate system, defining minimum and maximums distances of one voxel neighboring voxels defining multi-dimensional maximum offsets that an occupied point can maintain relative to its center, detecting when the minimums or maximums of distance and/or offsets are violated, and in response thereto adjusting to satisfy minimum and maximum for distance and offsets, and repeating the detecting and adjustment steps for the entire occupancy map until there are essentially no violations.

8 Claims, 3 Drawing Sheets

OTHER PUBLICATIONS

Acosta, E. et al., "Haptic Texture Generation—A Heuristic Method for Virtual Body Structures," 14th IEEE Symposium on Computer–based Medical Systems 2001, Jul. 26–27, 2001.

Temkin, B. et al., "Virtual Body Structures," 3rd Conference, Visible Human Project, Washington, D.C., Oct. 2000.

Marcy, G. et al., "Tactile Max: A Haptic Interface for 3D Studio Max," The third PHANToM User Workshop (PUG 98), Oct. 3–6, 1998 MIT Endicott House, Dedham, MA.

Vahora, F. et al., "Virtual reality and women's health: A breast biopsy system," The Conference of Physical & Informational Technologies: Options for a New Era in Healthcare, Jan. 20–23, 1999.

Vahora, F. et al., "Development of Real–Time Virtual Reality Haptic Application: Real–Time Issues," Proc. $12^{th}$ Symp. IEEE/Computer–Based Medical Systems CBMS–1999, Jun. 19–20, 1999.

Poceciun, V.V. et al., "Computerized Collection and Analysis of HVI Data," Beltwide Cotton Conference, Jan. 3–7, 1999.

Poceciun, V.V. et al., "Integration of Advanced Technology Into a Cotton Analysis and Decision Support System," Beltwide Cotton Conference, Jan. 3–7, 1999.

* cited by examiner

HAPTIC RENDERING OF VOLUMETRIC SOFT-BODIES OBJECTS

RELATED APPLICATIONS

The present application claims the benefits of U.S. Provisional Application Ser. No. 60/156,852 filed on Sep. 30, 1999.

FIELD OF THE INVENTION

The present invention relates to processes and apparatus for interfacing force-feedback devices (and like data acquisition transducers) to computers, to add touchability to computers. The invention is more particularly associated with such touchability addition to the art of computer haptic rendering of three-dimensional soft-bodied objects.

BACKGROUND OF THE INVENTION

The interfacing of force-feedback devices (haptic interface devices) to computers adds touchability in computer generated interactions, called in the state of the art and herein, computer haptics. Two major components of computer haptics are collision detection of virtual objects with the haptic interface device, and the determination and display of appropriate force feedback to the user via the haptic interface device. Prior art data structures and algorithms applied to haptic rendering have been adapted from non-pliable surface-based (two dimensional) graphic systems. These prior art techniques and systems are sometimes inappropriate due to the different characteristics required for haptic rendering of three dimensional or volumetric soft bodies.

It is an object of the present invention to develop software and hardware suitable for haptic rendering of volumetric soft bodies.

It is a further object of the present invention to provide apparatus and processes for providing computer generated haptic renderings that accommodate the needs of volumetric soft bodies through recursive processes with efficient management of computational resources and viable process and apparatus choices.

A still further object of the present invention is to provide collision detection and deformation presentations along with appropriate force feedback to a user to provide virtual interactions of a stylus and a volumetric soft body.

It is still a further object of the present invention to provide a computer haptics process and apparatus that operates in real time.

SUMMARY OF THE INVENTION

The above objects are satisfied and other limitations of the prior art are overcome in the present invention through computer modelling and coding systems operating on economically obtainable and usable hardware and operating systems. The modelling/coding systems include:

1) haptic rendering of 3D volumetric objects using occupancy-map algorithm (OMA) for collision detection. [This is accomplished in the present invention as an advance over the known OMA used for solid non-deformable convex virtual objects]; and 2) chainmail algorithm (CMA) for generation of the real-time feedback forces while accommodating deformation of the soft-bodied object. [This is accomplished in the present invention as an advance on the known CMA used for calculating the behavior of convex surface virtual objects].

Minimum and maximums distances in three dimensions that a voxel (a 3D point with defined x, y, z coordinates relative to a defined vertex/center) can stably maintain with neighboring voxels are determined. Relative movement of the position that a voxel takes relative to its center (while maintaining compliance with the minimum and maximum distances) is defined as "shear." When these minimums and maximums are violated a "collision" occurs, and the direction and relative forces can be inferred, so that such forces can be returned via a haptic device to the user. The minimum and maximum distances and the shears for all the voxels are adjusted to conform to the requirements and this calculation is carried out recursively until a stable state is evolved for all the voxels. In a preferred embodiment, the stable state is defined as a minimum energy state where distances are balanced among the voxels and the points are at the center or rest position with no shear. Such a minimum energy state calculation, per se, is well understood in the art.

An advantage of the present invention is that the characteristics of the voxels may be varied to model non-homogeneous soft bodies.

The physical parameters of the materials involved are known in the art, so that the deformation, resistance to forces and penetration and/or bouncing can be modelled, as is known in the art.

Using the improved versions of these techniques overcomes the limitations of the haptic prior art when applied to volumetric soft-bodied objects.

Another aspect of the present invention allows for the penetration of a soft three-dimensional body while maintaining proper force feedback by use of a proxy form of the penetrating body, a stylus in an embodiment. In yet another aspect of the present invention provision is made for the bouncing of one body after colliding with another.

Other objects, features and advantages will be apparent from the following detailed description of preferred embodiments taken in conjunction with the accompanying drawings in which:

DESCRIPTION OF PREFERRED EMBODIMENTS

Figure 1:
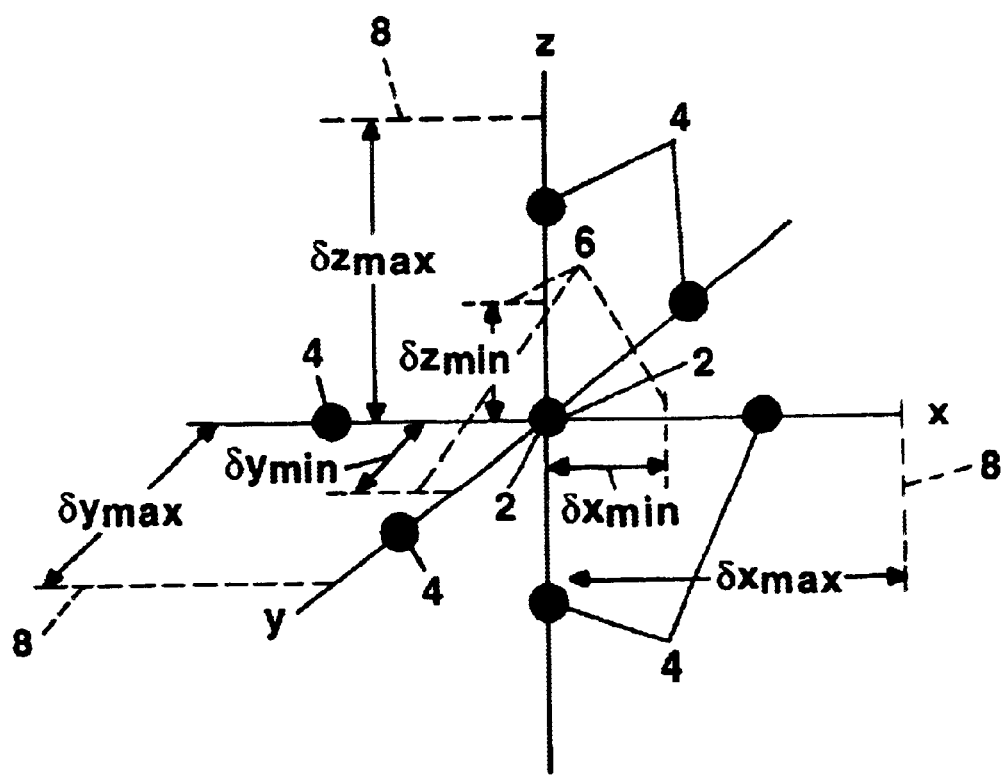
FIG. 1 is a diagram of the chainmail model for the nearest neighbor distance.

FIG. 1 illustrates the model used for determining touching or collisions between a haptic interface device and a virtual object. This is a first step of haptic interaction with virtual objects. In a haptic virtual reality system (HVRS) an interaction with a virtual object is done by "touching" the object using a haptic interface device—a stylus, and feeling the force feedback through the haptic device just as if the object were touched in reality. A real-time operation of a HVRS is necessary to be useful (it is evident that time delays would make the system useless), and real time operation requires efficient collision detection. The present invention provides such efficient collision detection.

The virtual environment and virtual objects are stored in memory in a three dimensional array called an occupancy map. When the occupancy map is initialized, each position in the map is set to −1 meaning that position is unoccupied. When a virtual object is added to a scene defined by the occupancy map, the appropriate positions in the occupancy map are set to 0. The borders of the virtual scene follow this same pattern as well. Other such encoding/modelling schemes, known in the art can be also used to advantage.

Figure 2:
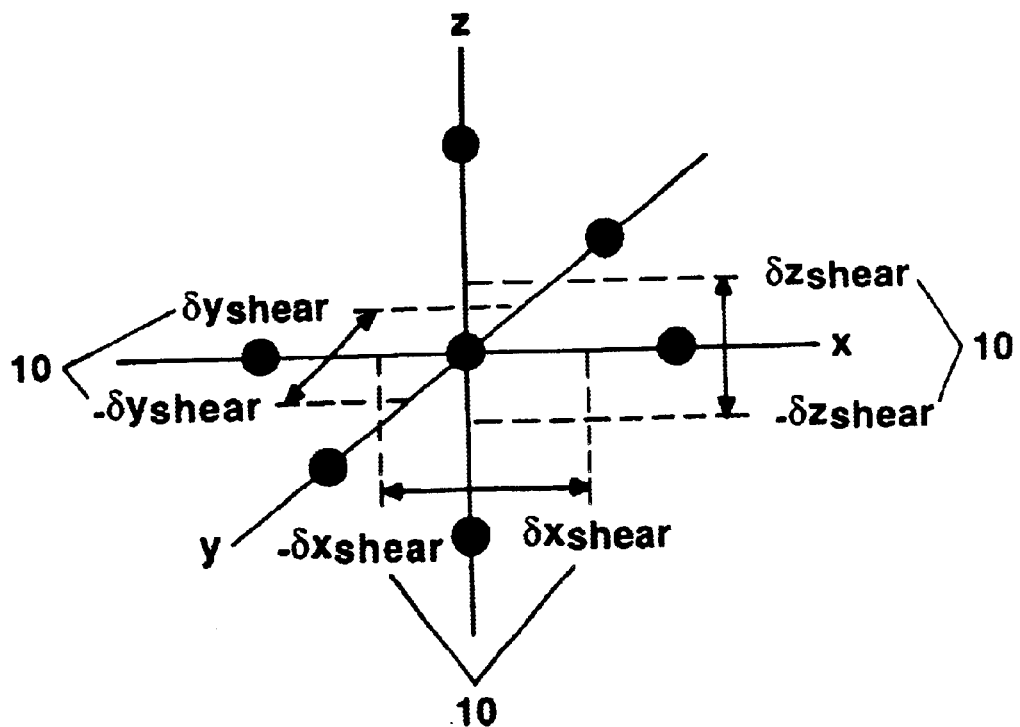
FIG. 2 is a diagram of the chainmail model for shear.

The chainmail algorithm operates in a manner similar to the movements of a chained armor regarding the individual linked pieces of the armor relative to its neighbors. With reference to FIG. 1, a "voxel" is herein defined a three dimension (3D) volumetric "point" 2 which represents one piece of chain mail that is linked to its nearest neighbors 4 in three dimensions. It should be noted that a neighbor may be along a positive or negative direction on the three axes; therefore there may be up to six such nearest neighbors. FIG. 1 illustrates the minimum and maximum distances that a voxel and its linked neighboring voxels are allowed to move maintaining stability. In each of the three dimensions there is an minimum 6 and an allowable maximum 8 axis location defining an allowed delta position relative to the position of the voxel 2 under consideration. Once the occupancy map algorithm, OMA, determines a collision, the chainmail algorithm, CMA, determines the geometry of the neighboring vertices including the direction(s) of the movements. With respect to FIG. 2, "shear" herein is measured by the positive or negative delta 10 (difference) in position of the voxel under consideration compared to its neighbors along each of the three axes. With respect to FIGS. 1 and 2, whenever the minimum 6 or the maximum 8 distances or shear distances are violated, the neighboring voxels are adjusted to compensate for the discrepancy so that the entire array of voxels meet the minimum and maximum deltas for position and shear. The process is recursively implemented until all the voxels in the system reach stability, i.e. meet the minimum, maximum deltas for position and shear criteria for the x, y and z directions.

When a collision occurs the relative positions of the voxels that violate the minimums and maximums of position and shear are used to determine the direction and force of the collision. The recursive nature of changing the relative positions of the voxels to meet the minimums and maximums for positions and shear cause the three dimensional object to distort in response to the direction and size of the colliding voxels, as is known in the art.

At any given time, the position of the haptic stylus and the occupancy map are used to determine a collision between the voxel at that position and the stylus tip. Furthermore, the direction of approach and "chain mesh" (the actual distances and deltas described above for position and shear) of the CMA are taken into account to resolve the collision with "ripple effects of other voxels" and the deformation (relative movement of the voxel) that occurs due to the collision.

Figure 3:
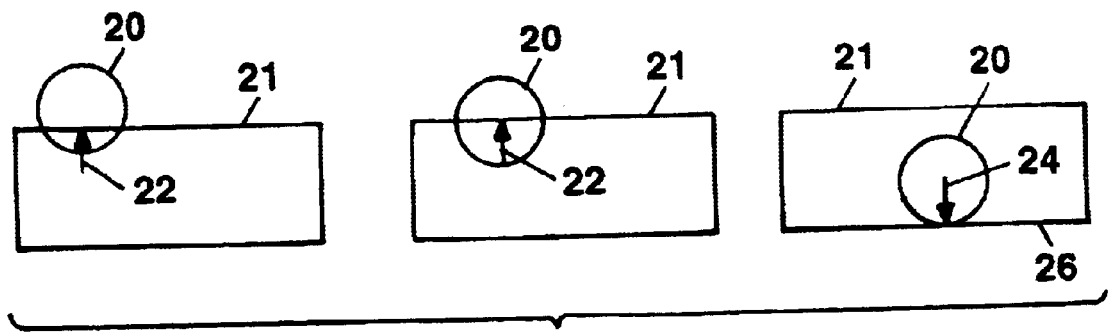
FIG. 3 is a representation of the haptic rendering of an object being penetrated.
Figure 4:
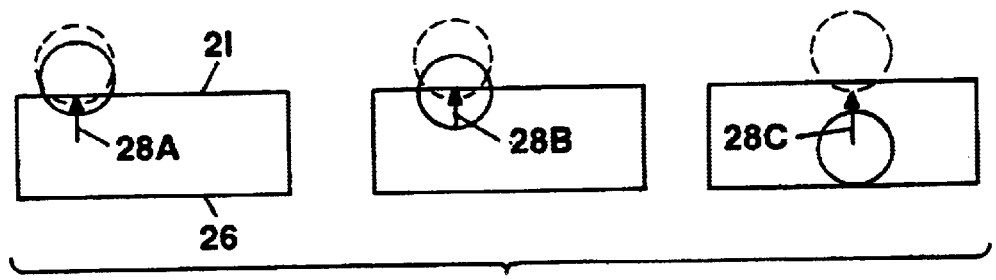
FIG. 4 represents the object of FIG. 3 but with the addition of a proxy.
Figure 5:
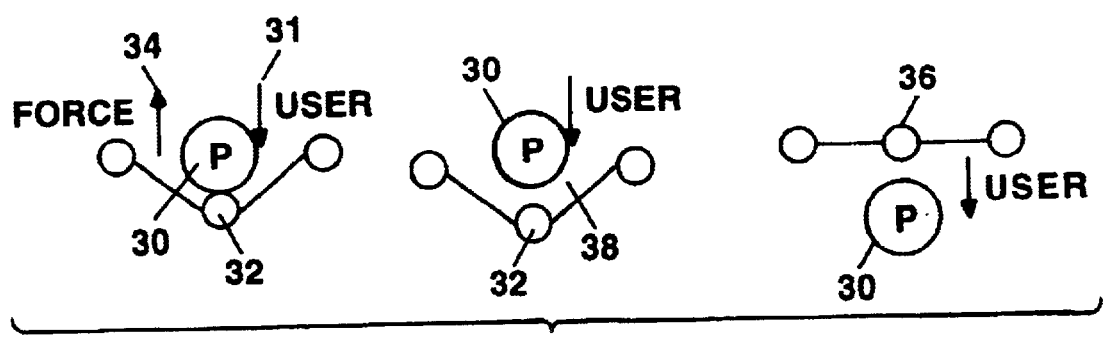
FIG. 5 is a representation of bounce from a surface when a strong force is used.

In a preferred embodiment the haptic device is the PHANToM® stylus which is well known in the art. In this system the software assumes the stylus is a point that interacts with an object as described with the occupancy map. In this system the force feedback on the haptic interface device is developed by the computer system as a function of the distance from the stylus point to the nearest surface. Modifying the surface based graphic haptic systems results in at least two major problems that must be overcome. One such problem occurs when the stylus approaches through penetration of an object. Care must be made to assure that the force which is presented by the computer system to the haptic device penetrates an object's surface and approaches the opposite surface remains in the proper direction as well as the proper magnitude. FIG. 3, illustrates this problem. The stylus 20 collides with the surface 21. The force 22 is directed by the computer system onto the haptic interface so that the user feels the force resisting penetration of the surface. But, as the stylus approaches the opposite surface 26, the force reverses direction 24 since the direction is computed with reference to surface 26, as if the stylus is penetrating that surface from the opposite direction. FIG. 4 illustrates a solution to this problem. Here a proxy stylus is created colliding with the surface. The virtual stylus continues to penetrate the object just shown in FIG. 3, but the proxy provides a continuous force 28A, 28B, and 28C that is applied to the haptic device that resists the continued penetration of the stylus as the stylus approaches the opposite surface. The second problem exists with some volumetric rendering software techniques when the contact is momentarily lost if the force is strong enough to bounce the point stylus away from the surface, although the user is still pushing towards the surface. The net effect is that the stylus position and the surface voxel pass through each other losing contact with each other. In such a case the voxel relaxes outward towards its original location. This loss of contact might result in no force feedback to the haptic device and no pressure against the surface. FIG. 5 illustrates this problem. The user pushes the proxy (stylus) 30 with a hard force 31 against the voxel 32 which provides a resisting force 34 to the haptic device. The surface deforms and bounces away 38 from the proxy and there is no resisting force and no force on the voxel 32. The user continues pushing and the proxy penetrates beyond the rest position of the voxel 32. With no force on it, the voxel 32 relaxes back to its rest position 36. At this point the proxy has penetrated the surface but the voxel 36 surface is intact—this represents an erroneous operation.

To help resolve this problem, the collision is checked at the location of the proxy and at the six directional points at a fixed radius distance from the proxy until the contact is made with a voxel whereupon the proper deformations and forces feedback via the haptic device to the user are established.

A related problem occurs with the voxel relaxing as described above. The virtual computing system must provide a damping action to the relaxing where the relaxing incurs only a small amount of vibration. Without this damping the vibration will not end and is visually disturbing.

The system software can accommodate nonhomogeneous behavior and response of the material within the soft bodies. This is accomplished by programming the force feedback resisting penetration of the bodies by a stylus. The density, resilience, viscosity, elasticity, and other physical parameters of the material or materials and can be modelled in the software to realistically react to different interactions of non-homogeneous materials and the stylus.

As discussed above many computing systems can be used to implement the present invention. In a preferred embodiment, a 266 MHz PC running the NT operating system, twelve megabytes for representing 11,200 polygons (voxels) was implemented. However, other computing systems, such as known in the art, including distributed systems and other operating systems can be used to advantage.

While the above description shows utilization of a family of disclosed special form OMA-CMA systems of the invention to deal with force-feedback in haptic rendering and analysis of soft body objects and conditions thereof, the systems of the invention, including the computer modelling and coding techniques thereof, can also be applied to other analogous situations of varying feedback intensity of measured or computed electronic, optical and magnetic responses associated with soft body volumes. The present invention incorporates such alternate usages.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:

1. A process for haptic rendering of three-dimensional soft bodied objects for virtual interactions comprising the steps of:
   forming a three dimensional occupancy map of voxels, forming the surface and bound the object;
   forming a multi-dimensional coordinate system for each point, the coordinate system defining a vertex center;
   defining minimum and maximums distances of one voxel to all its neighboring voxels (occupied neighbor points);
   defining multi-dimensional maximum offsets that an occupied point can maintain relative to its center;
   detecting when the minimums or maximums of distance and/or offsets are violated, and in response thereto
   moving the points in violation to locations relative to the neighboring occupied points and the points' centers that satisfy the minimum and maximum for distance and offsets;
   determining, from the relative moving of the points and the offsets from the center for each point, the direction and size of the force of the colliding bodies; and delivering that force in size and direction via a haptic device; and
   repeating the detecting and moving steps for the entire occupancy map until there are essentially no violations.

2. The process as defined in claim 1 further comprising determining a minimum energy state for all occupied points, and continuing the repeating of the detection and moving steps until the entire object is at a minimum energy state.

3. The process as defined in claim 1, wherein when one body collides with and penetrates or bounces from another, further comprising the steps of:
   forming a proxy of the penetrating or bouncing body that maintains its position on the surface, and wherein the moving of the points responds to the proxy as well as the penetrating body.

4. The process as defined in claim 1 further comprising damping the responses of the points as collisions occur.

5. An apparatus for haptic rendering of three-dimensional soft bodied objects for virtual interactions comprising in combination:
   means for forming a three dimensional occupancy map of voxels, forming the surface and bound the object;
   means for forming a multi-dimensional coordinate system for each point, the coordinate system defining a vertex center;
   means for defining minimum and maximums distances of one voxel to all its neighboring voxels (occupied neighbor points);
   means for defining multi-dimensional maximum offsets that an occupied point can maintain relative to its center;
   means for detecting when the minimums or maximums of distance and/or offsets are violated, and in response thereto
   means for moving the points in violation to locations relative to the neighboring occupied points and the points' centers that satisfy the minimum and maximum for distance and offsets; and
   means for determining from the relative moving of the points and the offsets from the center for each point the direction and size of the force of the colliding bodies, and for delivering that force in size and direction via a haptic device; and
   wherein the detecting means and moving means are capable of repeating the detecting and moving steps for the entire occupancy map until there are no violations.

6. The apparatus as defined in claim 1 further comprising means for determining a minimum energy state for all occupied points, and for continuing the repeating of the detection and moving steps until the entire object is at a minimum energy state.

7. The apparatus as defined in claim 1, constructed and arranged so that when one body collides with and penetrates or bounces from another, and a proxy of the penetrating or bouncing body is formed that maintains its position on the surface, and so that wherein the moving of the points responds to the proxy as well as the penetrating body.

8. The apparatus as defined in claim 1 further comprising means for damping the responses of the points as collisions occur.

* * * * *